July 26, 1966 D. B. NICHINSON 3,262,416
ALTIMETER STRUCTURE
Filed May 11, 1964

INVENTOR.
DAVID B. NICHINSON
BY
OSTROLENK, FABER, GERB & SOFFEN
ATTORNEYS

United States Patent Office 3,262,416
Patented July 26, 1966

3,262,416
ALTIMETER STRUCTURE
David B. Nichinson, Great Neck, N.Y., assignor to Kollsman Instrument Corporation, Elmhurst, N.Y., a corporation of New York
Filed May 11, 1964, Ser. No. 366,466
1 Claim. (Cl. 116—129)

This invention relates to aircraft altimeters, and more specifically relates to an altimeter having a novel, simple barometric altitude setting arrangement, which can be added to a presently existing aircraft instrument, for providing an auxiliary dial surface for use during landing and take-off wherein the pointer of the altimeter moves with respect to a dial which is adjustably positioned for airport altitude.

It is well known that altimeters must have means for indicating the altitude of take-off and landing levels which will be other than sea level.

The principle of the present invention is to provide a novel adjustable landing disk which can be manually set to an airport altitude wherein this disk is observable only during a landing or take-off mode of operation. By way of example, the disk may be concentric with the normal altitude dial and may be formed of some suitable light conducting material which can be illuminated independently of the normal dial structure.

During the take-off or landing mode of operation, this disk is illuminated by its own source of illumination which is turned on when this mode of operation is desired by the pilot. Thus, the pilot will now observe only the inner disk of the altimeter.

Accordingly, a primary object of this invention is to provide a simple barometric altitude adjustment mechanism.

Another object of this invention is to provide an auxiliary dial surface which is adjustable for a predetermined barometric altitude.

A further object of this invention is to provide a novel altimeter display having a normal operation portion and a landing and take-off portion which are individually illuminated.

These and other objects of this invention will become apparent from the following description when taken in connection with the drawings, in which.

Figure 1:
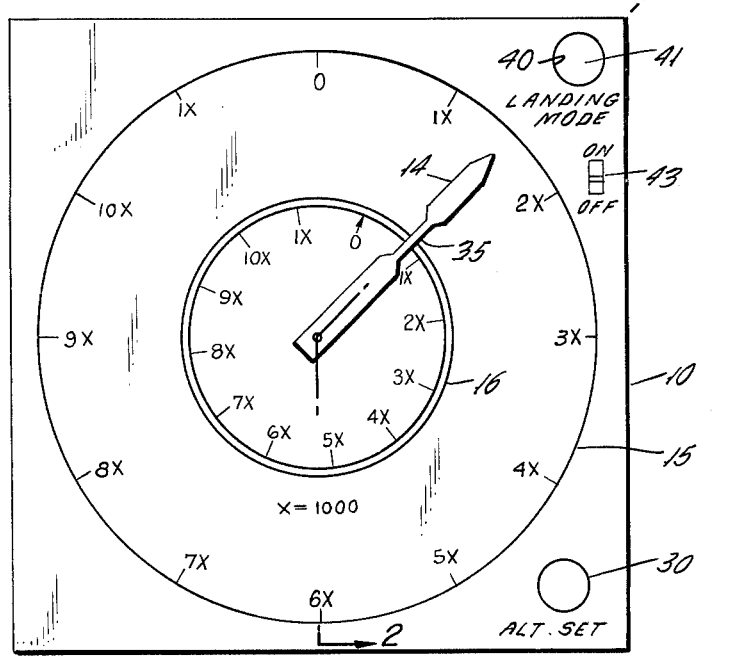
FIGURE 1 shows a front plan view of the novel instrument display of the invention.
Figure 2:
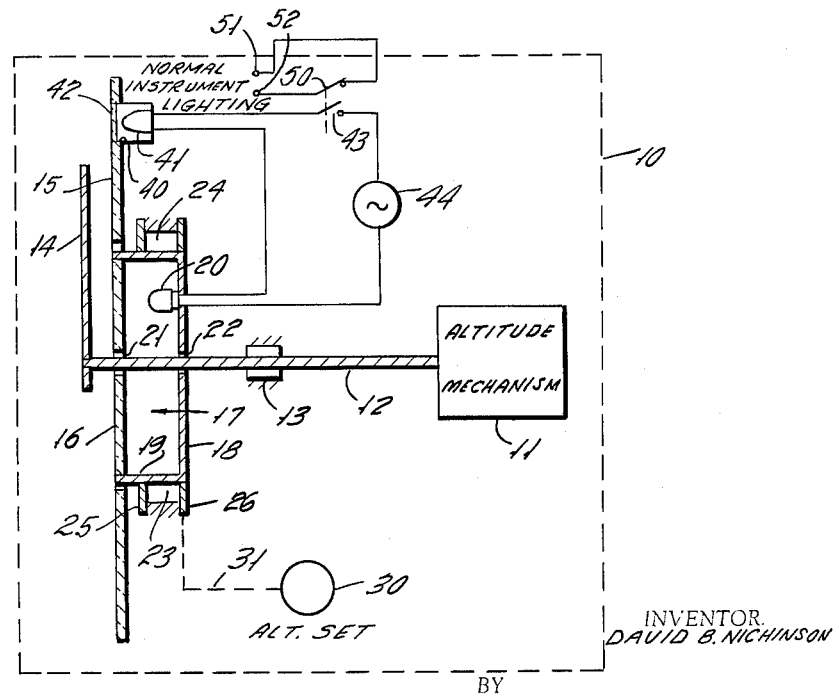
FIGURE 2 shows a cross-sectional view of the indicator portion of the instrument of FIGURE 1 taken across the line 2—2 in FIGURE 1.

Referring now to FIGURES 1 and 2, I have illustrated therein an altimeter contained in a casing 10 (shown in dotted lines in FIGURE 2) which has therein an altitude measuring mechanism 11 (FIGURE 2) which may be of any desired type well known to those skilled in the art. The altitude measuring mechanism 11 has an output shaft 12 which is carried in bearings 13 and is terminated by a pointer 14. The end of pointer 14 sweeps a dial 15 in the usual manner where the dial 15 can provide any desired altitude range. To this point, the instrument is completely standard. Dial 15 is, of course, fixed to the casing 10 in the usual manner.

In accordance with the present invention, a disk 16 which acts as a second dial is arranged concentric with dial 15 and is calibrated in a manner identical to dial 15. The disk 16, which is preferably of a translucent material is carried as one wall of a shallow container 17 (FIGURE 2) which includes a rear wall 18 and a peripheral rim 19. Container 17 then has a light source such as bulb 20 therein. The disk 16 and wall 18 have aligned openings 21 and 22 therein to permit passage of shaft 12 with sufficient clearance to prevent binding of shaft 12.

The shallow container 17 is then rotatably carried concentrically with respect to shaft 12 with suitable bearings such as bearings 23 and 24. Suitable rims such as rims 25 and 26 may extend from container 17 to prevent axial movement of the container 17. Clearly, the bearings 23 and 24 will be rigidly mounted in any suitable manner within the housing 10.

An altitude setting adjustment knob 30 is then provided in the casing 10 and is available for rotation by the pilot, and, as illustrated in FIGURE 2 by dotted lines 31, the altitude set knob 30 can rotate container 17 and thus the disk 16 with respect to the dial 15.

By way of example, and in FIGURE 1, the disk 16 has been adjusted so that its zero point aligns with the 700 foot mark on dial 15. This would correspond to a setting of the dial for an airport which has an altitude of 700 feet above sea level. Note particularly that pointer 14 has a constricted section 35 which permits the observation of the calibrations on disk 16.

An opening 40 is then made in the housing surface adjacent dial 15 for reception of a suitable slight source such as bulb 41 with the opening 40 closed by a suitable glass disk 42. The light bulb 41 and light bulb 20 are then connected in series with one another and with some suitable voltage source 44. A switch 43 is then provided, as illustrated in FIGURES 1 and 2, which will turn bulbs 20 and 41 on when the switch is closed.

The bulb 41 is observable through the opening 40 in the housing 10 of FIGURE 1. Thus, when the switch 43 is closed to the on position, bulb 41 is illuminated, and the disk 16 is also illuminated. Note that so long as bulb 20 is off, the dial 16 cannot be observed by the pilot since the normal instrument lighting will illuminate only the dial 15. That is to say, the inner disk 16 will be observable only during a landing or take-off mode when the switch 43 is closed.

In operation, and assuming the aircraft is flying in a normal manner, when the aircraft enters its landing mode, the disk 16 is set to the airport altitude by suitable adjustment of the altitude setting knob 30. With the switch 43 closed, the pilot will then land by observing the position of constriction 35 and pointer 14 with respect to the dial surface 16.

In order to prevent the accidental use of the outer scale 15 by the pilot, FIGURE 2 further illustrates the ganging of a switch 50 with switch 43 where the switch 50 operates to an open position to deenergize the normal instrument light source. Thus, the terminals 51 and 52 may be connected in series with the normal instrument lighting bulbs. By extinguishing these bulbs when switch 43 is closed, only disk 16 will be illuminated.

It will be further noted that since bulbs 20 and 41 are connected in series, the landing mode light 41 will be on only during landing or take-off. This series connection will also permit power or bulb malfunction detection.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claim.

The embodiments of the invention in which an exclusive privilege or property is claimed are defined as follows:

An altimeter structure comprising an altitude mechanism for measuring altitude pressure, and having movable output means movable as a function of altitude pressure, a rotatable indicating pointer, connection means connected from said movable output means to said rotatable indicating pointer for rotating said pointer as a function of altitude pressure, first support means connected to said connection means and supporting said connection means, a first and second dial having respective first and second circular dial surfaces, said first and second dial surfaces being coplanar, said indicating pointer mounted adjacent said first and second dial surfaces, said connection means extending through the axis of said first and second dials, the axis of rotation of said indicating pointed coaxial with the axis of said first and second circular dials, an altitude adjustment, second support means connected to said first support means and said first dial for stationarily mounting said first dial, bearing support means connected to said first and second support means and said second dial for rotatably mounting said second dial with respect to said first dial, said rotatable pointer rotatable with respect to both of said first and second dials, said second dial connected to said altitude adjustment means, said second dial rotating with respect to said first dial responsive to operation of said altitude adjustment means, and first and second illuminating means for said first and second dial surface repectively, independent control means connected to said first and second illuminating means for independently energized said first and second illuminating means, said independent cotrol means energizing said first illuminating means for illuminating said first dial surface during normal flight conditions, said independent control means energizing said second illuminating means for illuminating said second dial surface only during landing and take-off operation.

References Cited by the Examiner

UNITED STATES PATENTS

| | | | |
|---|---|---|---|
| 2,164,601 | 7/1939 | Urfer | 73—387 |
| 2,323,166 | 6/1943 | Urfer | 73—387 |
| 2,398,055 | 4/1946 | Springer | 73—387 |
| 2,706,407 | 4/1955 | Hosford | 116—129 |
| 2,874,671 | 2/1959 | Blackwell et al. | 116—129 |

LOUIS J. CAPOZI, *Primary Examiner.*